(12) United States Patent
Hwang et al.

(10) Patent No.: US 12,051,437 B2
(45) Date of Patent: Jul. 30, 2024

(54) IMPROVING SPEECH INTELLIGIBILITY BY VARYING GAINS OF SOUND TYPES BASED ON SCENE INFORMATION

(71) Applicant: SAMSUNG ELECTRONICS CO., LTD., Suwon-si (KR)

(72) Inventors: Inwoo Hwang, Suwon-si (KR); Kibeom Kim, Suwon-si (KR); Sunmin Kim, Suwon-si (KR); Hoon Heo, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/109,753

(22) Filed: Dec. 2, 2020

(65) Prior Publication Data

US 2021/0174821 A1 Jun. 10, 2021

(30) Foreign Application Priority Data

Dec. 9, 2019 (KR) .................. 10-2019-0162644

(51) Int. Cl.
*G10L 21/0308* (2013.01)
*G06N 3/04* (2023.01)
*G10L 21/057* (2013.01)

(52) U.S. Cl.
CPC ............ *G10L 21/0308* (2013.01); *G06N 3/04* (2013.01); *G10L 21/057* (2013.01)

(58) Field of Classification Search
CPC . G10L 21/0308; G10L 21/057; G10L 21/034; G10L 21/0364; G10L 21/0272; G10L 25/30; G06N 3/04; H04R 5/04

See application file for complete search history.

(56) References Cited

U.S. PATENT DOCUMENTS

| 6,889,186 | B1 | 5/2005 | Michaelis |
| 8,195,454 | B2 | 6/2012 | Muesch |
| 9,031,838 | B1 * | 5/2015 | Nash ................... H04M 3/2227 704/226 |
| 9,536,536 | B2 | 1/2017 | Hetherington et al. |

(Continued)

FOREIGN PATENT DOCUMENTS

| CN | 104078050 A | 10/2014 |
| CN | 104080024 A | 10/2014 |

(Continued)

OTHER PUBLICATIONS

International Search Report (PCT/ISA/210) issued Mar. 9, 2021 by the International Searching Authority in counterpart International Patent Application No. PCT/KR2020/016638.

(Continued)

*Primary Examiner* — Michael N Opsasnick
(74) *Attorney, Agent, or Firm* — Sughrue Mion, PLLC

(57) ABSTRACT

Provided are an electronic apparatus and a controlling method thereof. The electronic apparatus includes an inputter and a processor configured to, based on receiving an audio signal through the inputter, obtain a speech intelligibility for the audio signal, and modify the audio signal so that the speech intelligibility becomes a target intelligibility that is set based on scene information regarding a type of audio included in the audio signal, and the type of audio includes at least one of a sound effect, shouting, music, or a speech.

18 Claims, 6 Drawing Sheets

(56) References Cited

U.S. PATENT DOCUMENTS

| | | | |
|---|---|---|---|
| 9,548,713 | B2 | 1/2017 | Wang et al. |
| 9,578,436 | B2 | 2/2017 | Scheirer et al. |
| 9,812,149 | B2 | 11/2017 | Yen |
| 9,842,605 | B2 | 12/2017 | Lu et al. |
| 9,905,245 | B2 | 2/2018 | Ida |
| 10,586,551 | B2 | 3/2020 | Yuan |
| 10,924,614 | B2 | 2/2021 | Yuan |
| 11,017,778 | B1* | 5/2021 | Thomson .......... H04M 3/42382 |
| 11,037,581 | B2 | 6/2021 | Choo et al. |
| 2004/0249650 | A1* | 12/2004 | Freedman .......... G06Q 30/0201 |
| | | | 705/7.29 |
| 2008/0255829 | A1 | 10/2008 | Cheng |
| 2009/0018825 | A1* | 1/2009 | Bruhn .................... G10L 25/69 |
| | | | 704/E19.002 |
| 2013/0297306 | A1 | 11/2013 | Hetherington et al. |
| 2014/0278392 | A1 | 9/2014 | Ramabadran et al. |
| 2015/0172831 | A1 | 6/2015 | Dittberner et al. |
| 2015/0237454 | A1* | 8/2015 | Scheirer .................... H04S 7/30 |
| | | | 381/17 |
| 2015/0302862 | A1* | 10/2015 | Hetherington .......... G10L 19/09 |
| | | | 704/224 |
| 2016/0049915 | A1 | 2/2016 | Wang et al. |
| 2016/0078879 | A1 | 3/2016 | Lu et al. |
| 2017/0221501 | A1 | 8/2017 | Yen |
| 2017/0365270 | A1 | 12/2017 | Yuan |
| 2018/0336902 | A1* | 11/2018 | Cartwright .............. G06F 16/61 |
| 2019/0110135 | A1 | 4/2019 | Jensen et al. |
| 2019/0131948 | A1 | 5/2019 | Cho et al. |
| 2019/0166435 | A1* | 5/2019 | Crow ...................... H04R 25/43 |
| 2019/0179600 | A1 | 6/2019 | An |
| 2019/0348058 | A1 | 11/2019 | Choo et al. |
| 2019/0392852 | A1* | 12/2019 | Hijazi ................. H04N 21/2335 |
| 2020/0043516 | A1 | 2/2020 | Jansson et al. |
| 2020/0160878 | A1 | 5/2020 | Heo et al. |
| 2020/0168237 | A1 | 5/2020 | Yuan |
| 2021/0176580 | A1* | 6/2021 | Hwang .................... G06N 3/02 |

FOREIGN PATENT DOCUMENTS

| | | | |
|---|---|---|---|
| CN | 105556593 | A | 5/2016 |
| CN | 107564538 | A | 1/2018 |
| CN | 108604450 | A | 9/2018 |
| CN | 109065067 | A | 12/2018 |
| CN | 109448755 | A | 3/2019 |
| EP | 2 884 766 | A1 | 6/2015 |
| JP | 6039108 | B2 | 12/2016 |
| JP | 6505252 | B2 | 4/2019 |
| KR | 10-2011-0062594 | A | 6/2011 |
| KR | 10-2012-0064105 | A | 6/2012 |
| KR | 10-1886775 | B1 | 8/2018 |
| KR | 10-1958664 | B1 | 3/2019 |
| KR | 10-2019-0057052 | A | 5/2019 |
| KR | 10-1986905 | B1 | 6/2019 |
| KR | 10-2020-0063290 | A | 6/2020 |
| WO | 2011/031273 | A1 | 3/2011 |

OTHER PUBLICATIONS

Written Opinion (PCT/ISA/237) issued Mar. 9, 2021 by the International Searching Authority in counterpart International Patent Application No. PCT/KR2020/016638.

Communication issued May 14, 2021 by the European Patent Office in counterpart European Patent Application No. 20212328.7.

Benjamin W.Y. Hornsby, "The Speech Intelligibility Index: What is it and what's it good for?", The Hearing Journal, Oct. 2004, vol. 57, No. 10, pp. 10-17 (5 pages total).

Andreas Jansson et al., "Singing Voice Separation with Deep U-Net Convolutional Networks", Proceedings of the 18th ISMIR Conference, Oct. 23-27, 2017, Suzhou, China, pp. 745-751 (8 pages total).

Examination Report issued Aug. 19, 2022 by the European Patent Office for European Patent Application No. 20212328.7.

Communication dated Jan. 23, 2024, issued by the European Patent Office in counterpart European Application No. 20212328.7.

Communication dated Apr. 26, 2024, issued by the China National Intellectual Property Administration in counterpart Chinese Application No. 202011426799.2.

Communication dated Apr. 29, 2024, issued by the Korean Intellectual Property Office in Korean Patent Application No. 10-2019-0162644.

* cited by examiner

IMPROVING SPEECH INTELLIGIBILITY BY VARYING GAINS OF SOUND TYPES BASED ON SCENE INFORMATION

CROSS-REFERENCE TO RELATED APPLICATION(S)

This application is based on and claims priority under 35 U.S.C. § 119 to Korean Patent Application No. 10-2019-0162644, filed on Dec. 9, 2019, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus performing an operation corresponding to a user's speech and a controlling method of an electronic apparatus.

2. Description of Related Art

With the development of Internet and streaming services, many contents are being consumed in multimedia devices. However, due to various factors including environmental factors such as a content reproduction environment (environmental noise, or the like) or a limitation of a device speaker, content production factors such as outdoor recording or lack of editing time, or the like, a situation in which a speech included in the reproduced contents is not heard well may occur.

Specifically, as a result of a 24-hour analysis of audio signals provided by five broadcasting companies, it has been found that a ratio of the speech content was about 91.8%, and the power of the speech and the power of other signals other than the speech were the same. Thus, this analysis shows that a section where speech transmission is not good is 30% or more. As a result, greater importance is focused on the speech transmission capability of contents.

In the related art, there is a technology to control power of each frequency band, thus improving intelligibility of speech, based on non-speech sound volume and speech probability of an input audio signal.

However, in the related art, a non-speech volume is measured by tracking a minimum value of the power for each frequency band, and it is impossible to properly measure the non-speech that abruptly increases, other than non-speech that is maintained constant, and non-speech cannot be accurately measured due to a sensitivity problem of a recording microphone, post-correction, or the like. In addition, since the parameters related to a final output are adjusted by measuring the probability of speech by frequency bands, the speech and non-speech of the same band increase together and for output.

Further, in the related art, since only an operation of enhancing the speech intelligibility is performed for all kinds of input content, there is a problem that the producing intention of a producer according to the type of audio content is not reflected in the control of speech intelligibility.

SUMMARY

Provided are an electronic apparatus performing an operation corresponding to a user's speech and a controlling method thereof.

Additional aspects will be set forth in part in the description which follows and, in part, will be apparent from the description, or may be learned by practice of the presented embodiments.

In accordance with an aspect of the disclosure, an electronic apparatus includes an inputter and a processor configured to, based on receiving an audio signal through the inputter, obtain a speech intelligibility included in the audio signal, and modify the audio signal so that the speech intelligibility becomes a target intelligibility that is set based on scene information regarding a type of audio included in the audio signal, and the type of audio includes at least one of a sound effect, shouting, music, or a speech.

The processor may be further configured to calculate the speech intelligibility based on a speech signal and a non-speech signal other than the speech signal, included in the audio signal.

The processor may be further configured to extract the speech signal included in the audio signal using an artificial intelligence model trained to extract speech signals included in audio signals, and to extract, from the audio signal, one or more remaining signals other than the extracted speech signal, as the non-speech signal.

The speech intelligibility may be one of a signal to noise ratio (SNR) of the speech signal and the non-speech signal included in the audio signal and a speech intelligibility index (SII) based on the speech signal and the non-speech signal.

The speech intelligibility may be the SNR, and the processor may be further configured to adjust a gain of the speech signal by as much as a difference value between the target intelligibility and the obtained speech intelligibility to modify the audio signal.

The speech intelligibility may be the SII, the processor may be further configured to calculate a gain adjustment value and adjust a gain of the speech signal by as much as the calculated gain adjustment value to modify the audio signal, the gain adjustment value may be calculated according to: gain adjustment value=$\alpha^*(\text{SII}_{target}-\text{SII}_{measurement})+\beta$, and $\text{SII}_{target}$ may denote the target intelligibility, $\text{SII}_{measurement}$ may denote the obtained speech intelligibility, and $\alpha$ and $\beta$ may denote constant values experimentally calculated through a change in a number of the SII over a change in the gain of the speech signal.

The processor may be further configured to obtain at least one audio feature with respect to the audio signal and obtain the scene information based on the obtained at least one audio feature.

The processor may be further configured to obtain the scene information using an artificial intelligence model trained to distinguish audio types included in audio signals.

The target intelligibility may be set differently with respect to different audio types.

Based on the audio type being the sound effect, the target intelligibility may be set to be higher than a case in which the audio type is the shouting.

In accordance with another aspect of the disclosure, a method of controlling an electronic apparatus includes obtaining an audio signal, obtaining a speech intelligibility for the audio signal based on the audio signal, and modifying the audio signal so that the speech intelligibility becomes a target intelligibility that is set based on scene information regarding a type of audio included in the audio signal, and the type of audio includes at least one of a sound effect, shouting, music, or a speech.

The obtaining the speech intelligibility may comprise calculating the speech intelligibility based on a speech signal and a non-speech signal other than the speech signal, included in the audio signal.

The obtaining the speech intelligibility may comprise extracting the speech signal included in the audio signal using an artificial intelligence model trained to extract speech signals included in audio signals; and extracting, from the audio signal, one or more remaining signals other than the extracted speech signal, as the non-speech signal.

The speech intelligibility may be one of a signal to noise ratio (SNR) of the speech signal and the non-speech signal included in the audio signal and a speech intelligibility index (SII) based on the speech signal and the non-speech signal.

The speech intelligibility may be the SNR, and the modifying may comprise adjusting a gain of the speech signal by as much as a difference value between the target intelligibility and the obtained speech intelligibility to modify the audio signal.

The speech intelligibility may be the SII, the modifying may comprise calculating a gain adjustment value and adjusting a gain of the speech signal by as much as the calculated gain adjustment value to modify the audio signal, the gain adjustment value may be calculated according to: gain adjustment value=$\alpha*(SII_{target}-SII_{measurement})+\beta$, and SII target may denote the target intelligibility, $SII_{measurement}$ may denote the obtained speech intelligibility, and $\alpha$ and $\beta$ may denote constant values experimentally calculated through a change in a number of the SII over a change in the gain of the speech signal.

The method of controlling an electronic apparatus may further comprise obtaining at least one audio feature with respect to the audio signal and obtaining the scene information based on the obtained at least one audio feature.

The method of controlling an electronic apparatus may further comprise obtaining the scene information using an artificial intelligence model trained to distinguish audio types included in audio signals.

The target intelligibility may be set differently with respect to different audio types.

In accordance with another aspect of the disclosure, an electronic apparatus includes a memory storing instructions; and a processor configured to execute the instructions to: obtain a speech intelligibility for an audio signal, and modify the audio signal so that the speech intelligibility becomes a target intelligibility, wherein the target intelligibility is set based on a determined type of audio included in the audio signal.

In accordance with another aspect of the disclosure, a non-transitory computer-readable recording medium has recorded thereon instructions executable by at least one processor to perform the method of controlling the electronic apparatus.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Provided is an electronic apparatus capable of controlling speech intelligibility more accurately and a method for controlling thereof. In accordance with one or more embodiments, provided are an electronic apparatus capable of controlling speech intelligibility optimally, based on, reflecting, or in consideration of a producing intention of audio content, and a controlling method thereof.

It is understood that the suffix "part" for a component used in the following description is given or used in consideration of the ease of writing the specification, and does not have a distinct meaning or role as it is.

The terms used in the description are used to describe embodiments, but may not intend to limit the scope of other embodiments. Unless otherwise defined specifically, a singular expression may encompass a plural expression.

It is to be understood that the terms such as "comprise" or "consist of" are used herein to designate a presence of characteristic, number, operation, element, component, or a combination thereof, and not to preclude a presence or a possibility of adding one or more of other characteristics, numbers, operations, elements, components or a combination thereof.

As used herein, the terms "first," "second," or the like may identify corresponding components, regardless of order and/or importance, and are used to distinguish a component from another without otherwise limiting the components.

If it is described that an element (e.g., first element) is "operatively or communicatively coupled with/to" or is "connected to" another element (e.g., second element), it may be understood that the element may be connected to the other element directly or through still another element (e.g., third element). When it is mentioned that one element (e.g., first element) is "directly coupled" with or "directly connected to" another element (e.g., second element), it may be understood that there is no element (e.g., third element) present between the element and the other element.

The terms used in the embodiments can be interpreted in accordance with meanings well-known to those skilled in the art, unless otherwise defined.

Various embodiments will be described in greater detail with reference to the attached drawings.

Figure 1:
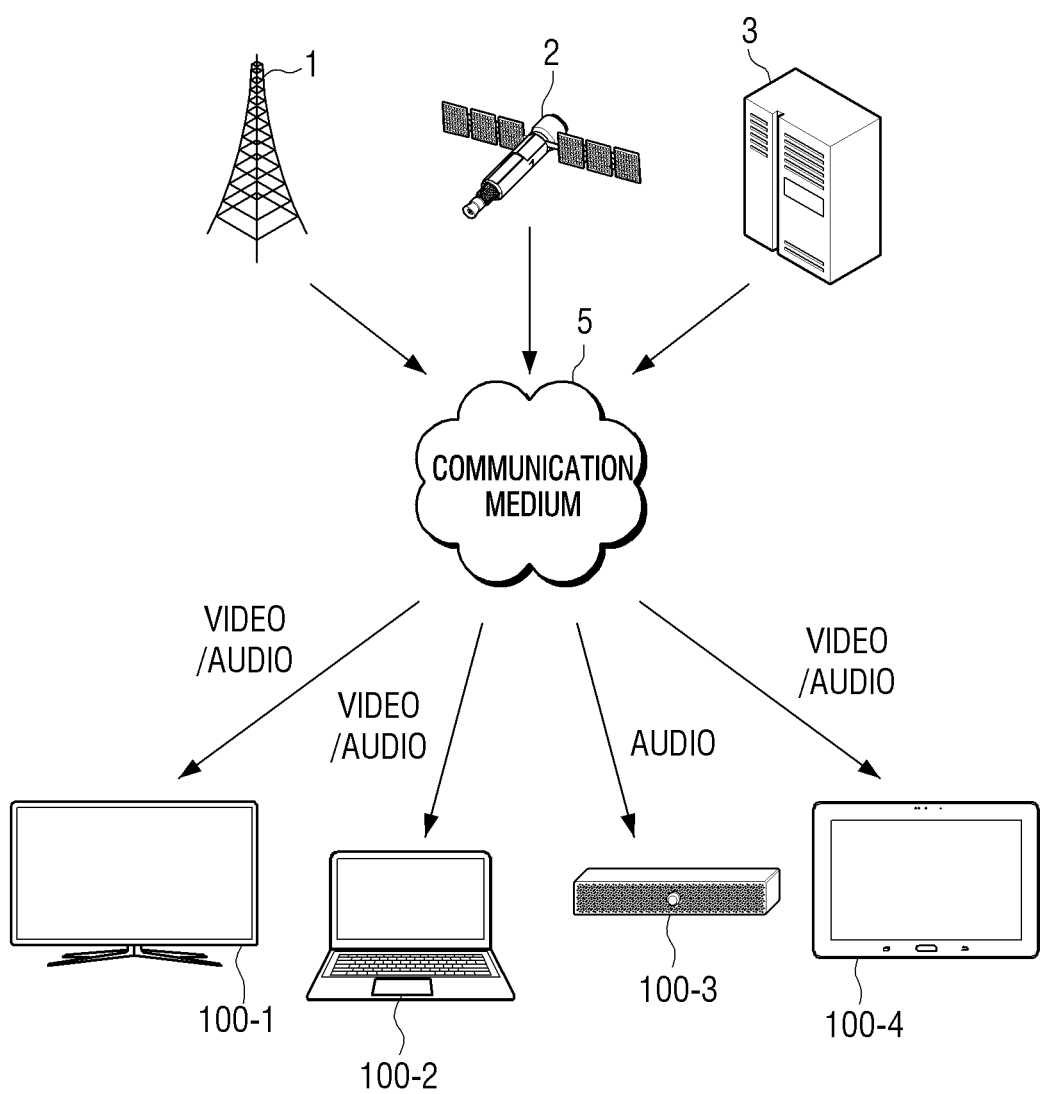
FIG. 1 is a diagram illustrating an environment in which an audio content including an audio signal is provided to an electronic apparatus through a network, according to an embodiment.

FIG. 1 is a diagram illustrating an environment in which an audio content including an audio signal is provided to an electronic apparatus 100-1 to 100-4 through a network, according to an embodiment.

As illustrated in FIG. 1, an audio content (or a sound source) may be provided to the electronic apparatus 100-1 to 100-4 from a broadcast transmitting station 1, a satellite 2, a content providing server 3, or the like, through a communication medium 5 (e.g., a network or the Internet).

The audio content may be composed of a multi-channel audio signal such as a stereo channel audio signal or a 5.1 channel audio signal, but is not limited thereto and may be composed of a single channel audio signal, a 7.1 channel audio signal, a 5.2 channel audio signal, etc. The audio content may be provided to the electronic apparatus 100 1 to 100-4 alone, depending on the type of content and/or the type of electronic apparatus, and may be provided to the electronic apparatuses 100-1 to 100-4 along with video content.

The broadcast transmitting station 1 may include a transmitter or a repeater for transmitting terrestrial broadcast content. The satellite 2 may include a satellite for communicating data or satellite broadcast content. The content providing server 3 may be a server on a communication network that provides broadcast content for Internet Protocol television (IPTV), broadcast content for cable television (TV), various sound source content, a video on demand (VOD) content, etc.

The communication medium 5 may include an air medium or a constructed communication network. The communication network may include a wireless cell network, Internet, wide area network (WAN), local area network (LAN), a wired phone network, a cable network, or the like.

The electronic apparatuses 100-1 to 100-4 may include not only an audio device 100-3 capable of reproducing only an audio content but also a display device 100-1, 100-2, and 100-4 capable of reproducing video and audio together.

The display devices 100-1, 100-2, and 100-4 are devices including a display for reproducing a video and outputting audio through a speaker, such as a smart TV, a monitor, a smartphone, a desktop computer, a laptop computer, a tablet, a navigation device, digital signage, or the like.

The audio device 100-3 is an electronic apparatus configured to reproduce and output only audio and, for example, the audio device 100-3 may include a radio device, an audio device, a phonograph, a speech recognition speaker device, a compact disk player equipped with a speaker, a digital audio player (DAP), an audio device for a vehicle, a home appliance equipped with a speaker, a sound bar, various devices capable of performing an output operation of sound, or the like.

When (or based on) an audio signal constituting the audio content is received through the communication medium 5, the electronic apparatus 100-1 to 100-4 may process the received audio signal to generate an output signal, and may output the generated output signal through at least one speaker. The at least one speaker may be provided in the electronic apparatuses 100-1 to 100-4, and/or may be separately disposed outside the electronic apparatuses 100-1 to 100-4 according to an embodiment.

According to an embodiment, the electronic apparatuses 100-1 to 100-4 may identify (or obtain, determine, calculate, etc.) the intelligibility of speech (e.g., a speech intelligibility value) included in the received audio signal and correct or modify the audio signal so that the identified speech intelligibility becomes a target intelligibility (e.g., a target intelligibility value) and generate an output signal. The target intelligibility may be set based on scene information regarding a type of audio included in the received audio signal (e.g., sound effect, shouting, music, a speech, etc.)

Specifically, unlike the related art in which the minimum value of the power for each frequency band is tracked to measure the non-speech volume, the electronic apparatuses 100-1 to 100-4 according to embodiments may separate the speech signal and the non-speech signal from the received audio signal and identify the intelligibility of the speech based on the separated speech signal and the non-speech signal.

The electronic apparatuses 100-1 to 100-4 may, unlike the related art that measures probability of speech by frequency bands for adjusting parameters related to the final output, adjust speech intelligibility by performing a gain adjustment of at least one of a separated speech signal and non-speech signal, or performing various processing for the separated speech signal and the non-speech signal.

The electronic apparatuses 100-1 to 100-4 may set the target intelligibility based on scene information regarding the type of audio included in the audio signal, unlike the related art that only performs the operation of increasing speech intelligibility for all kinds of content being input. Accordingly, the electronic apparatuses 100-1 to 100-4 may correct the audio signal such that the intelligibility of the speech of the received audio signal is the set target intelligibility.

As described above, according to embodiments, the speech signal and the non-speech signal may be separated from the audio signal to identify the speech intelligibility, and at least one of the separated speech signal and the non-speech signal is processed to adjust the speech intelligibility, so that the speech intelligibility can be more accurately adjusted.

Further, as the target intelligibility is set based on the scene information, adjustment of intelligibility of speech may be performed to be different for each audio type, and a producing intention of an audio content producer may be reflected therethrough.

While it has been described that the audio content is provided through the communication medium 5 from the outside of the electronic apparatuses 100-1 to 100-4, it is understood that one or more other embodiments are not limited thereto.

For example, the audio content may be provided to the electronic apparatuses 100-1 to 100-4 through a portable storage medium such as a universal serial bus (USB), a secure digital (SD) memory card, or the like, various optical storage medium, or the like.

The audio content may be stored in a storage of the electronic apparatus 100-1 to 100-4 (e.g., a hard disk drive (HDD), a solid state drive (SSD), a system memory (ROM, BIOS, etc.), etc., and output by the electronic apparatuses 100-1 to 100-4 (e.g., in response to or based on a user's request).

Figure 2:
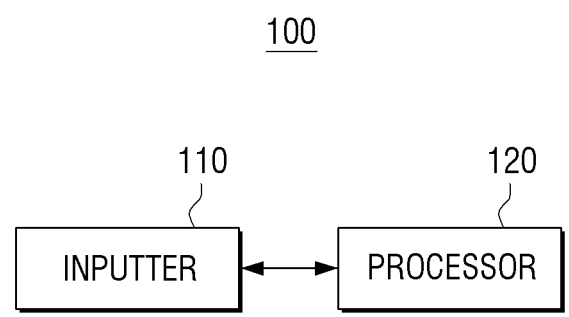
FIG. 2 is a block diagram of an electronic apparatus according to an embodiment.

FIG. 2 is a block diagram of an electronic apparatus 100 according to an embodiment. Referring to FIG. 2, the electronic apparatus 100 includes an inputter 110 and a processor 120.

The inputter 110 may receive an audio signal and provide the received audio signal to the processor 120. As described above, the audio signal can be provided to the electronic apparatus 100 through a communication medium 5 or through an external portable storage medium. Accordingly, various wired and wireless communication interfaces for receiving an audio signal can perform functions of the inputter 110.

The audio signal may be provided to the processor 120 from the storage included in the electronic apparatus 100 and in this case, the storage included in the electronic apparatus 100 may perform a function of the inputter 110.

The processor 120 controls overall operations of the audio output device 100. The processor 120, based on receiving an audio signal through the inputter 110, may identify speech intelligibility included in the audio signal based on the received audio signal.

The processor 120 may identify the speech intelligibility based on the speech signal included in the audio signal and the non-speech signal excluding the speech signal from the audio signal.

For this purpose, the processor 120 may extract a speech signal from the audio signal and extract the remaining signal except the extracted speech signal as a non-speech signal. According to an embodiment, the processor 120 can extract a speech signal from an audio signal received through the inputter 110 by using an artificial intelligence model trained to extract a speech signal from an audio signal. It is understood, however, that one or more other embodiments are not limited thereto.

When the speech signal and the non-speech signal are extracted from the audio signal, the processor 120 may identify the speech intelligibility included in the audio signal based on the extracted speech signal and the non-speech signal.

Specifically, the processor 120 may calculate a signal to noise ratio (SNR) of the extracted speech signal and the non-speech signal, and can identify the calculated SNR as the speech intelligibility. The processor 120 can calculate a speech intelligibility index (SII) based on the extracted speech signal and the non-speech signal, and may identify the calculated speech intelligibility index as the speech intelligibility.

Accordingly, the processor 120 can correct the audio signal so that the identified speech intelligibility becomes the target intelligibility. In an embodiment of identifying the speech intelligibility using the SNR, the target intelligibility also has the SNR value, and in an embodiment of identifying the speech intelligibility using the speech intelligibility index, the target intelligibility can also have the speech intelligibility index value.

To be specific, when (or based on) identifying the speech intelligibility using the SNR, the processor 120 may adjust a gain of the speech signal by as much as a difference value between the target intelligibility and the identified speech intelligibility to correct an audio signal.

When (or based on) the speech intelligibility is identified by using the speech intelligibility index, the processor 120 can calculate a gain adjustment value based on equation 1 below, and may adjust the gain of the speech signal by the calculated gain adjustment value to correct the audio signal.

$$\text{gain adjustment value} = \alpha*(SII_{target} - SII_{measurement}) + \beta \quad \text{[Equation 1]}$$

Here, the $SII_{target}$ is a target intelligibility of the speech intelligibility index format, the $SII_{measurement}$ is the identified speech intelligibility of the speech intelligibility index format, and $\alpha$ and $\beta$ are constant values experimentally calculated through a numerical change of the speech intelligibility index according to a gain change of a speech signal.

It is understood that the method for calculating the gain adjustment value is not limited to the above equation 1. For example, while the above equation 1 uses a first-order linear regression, the processor 120 can obtain a more sophisticated gain adjustment value by using a quadratic equation such as $\alpha_1*(SII_{target} - SII_{measurement})2 + \alpha_2*(SII\ target - SII\ measurement) + \beta$, or a linear regression of higher order.

The processor 120 may obtain the gain adjustment value from specific index values (for example, SII, speech transmission index (STI) described below, or the like).

The audio signal in which speech intelligibility is adjusted may be output through at least one speaker disposed inside or outside the electronic apparatus 100.

In various embodiments, the target intelligibility described above can have a specific value for each type of audio as a value set based on scene information regarding the type of audio included in the audio signal. For example, where the speech intelligibility is identified to be the SII, the specific value may be directly set as the target intelligibility value, such as 0.6 for sound effect, 0.5 for shout, and 0.4 for music.

It is understood, however, that one or more other embodiments are not limited thereto. For example, target intelligibility may be set to a percentage value of intelligibility to be adjusted for each audio type. In this case, the percentage value of intelligibility to be adjusted may be set to target intelligibility, such as +10% for sound effect, −10% for shout, 0% for music. The processor 120 can calculate the actual target intelligibility value by calculating the percent value of the intelligibility to be adjusted in addition to the currently measured speech intelligibility.

The target intelligibility may be stored as a mapping table in a storage preset by audio types, and the processor 120 may check the target intelligibility value corresponding to the scene information with reference to the mapping table.

The scene information is a sub-concept of genre information and may include information on which type of audio included in the audio signal corresponds to any kind among sound effect, shout, music, and speech. For example, audio content of a "movie" genre can include various kinds of audio such as sound effect, shout, and music, and at this time, each audio type such as speech, sound effect, shout, and music can be scenes included in the audio signal.

According to an embodiment, the processor 120 can obtain at least one audio feature for an audio signal and obtain scene information based on the at least one obtained audio feature. In addition, according to another embodiment, the processor 120 can obtain scene information using an artificial intelligence model trained to identify the type of audio included in the audio signal.

The target intelligibility can be set according to scene information of the obtained audio signal. Specifically, the target intelligibility can be set differently for each type of audio included in the scene information. For example, the target intelligibility can be set higher when the type of audio is a sound effect than when the type of audio is shout, although it is understood that one or more other embodiments are not limited thereto.

According to various embodiments, a producing intention of a content producer may be reflected or considered in an intelligibility adjustment by setting a target intelligibility value based on scene information and adjusting an audio signal based thereon.

Hereinbelow, various embodiments will be further described with reference to FIGS. 3 and 4.

Figure 3:
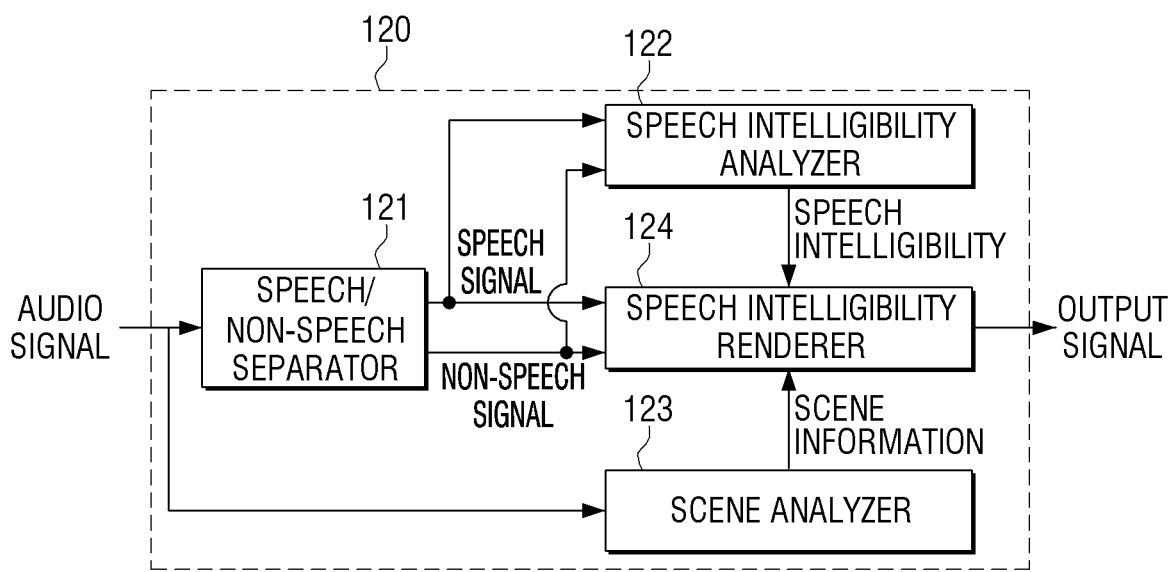
FIG. 3 is a functional block diagram of a processor according to an embodiment.

FIG. 3 is a functional block diagram of a processor 120 according to an embodiment. Referring to FIG. 3, the processor 120 may include a speech/non-speech separator 121, a speech intelligibility analyzer 122, a scene analyzer 123, and a speech intelligibility renderer 124.

The speech/non-speech separator 121 may separate and/or extract a speech signal and a non-speech signal from an audio signal received through the inputter 110.

The speech/non-speech separator 121 may extract a speech signal from an audio signal and extract the remaining signal(s) other than the extracted speech signal as a non-speech signal.

According to an embodiment, when the received audio signal is an audio signal including a separate speech channel, the speech/non-speech separator 121 may extract a signal of the corresponding speech channel as a speech signal and extract a signal of the remaining channel(s) as a non-speech signal.

According to another embodiment, since a non-speech signal can be mixed in a signal of a speech channel, the speech/non-speech separator 121 may extract a speech signal from a signal of a speech channel and may extract a remaining non-speech signal of the speech channel, excluding the extracted speech signal, and a signal of the remaining channel as a non-speech signal.

For example, many audio signals reproduced in an electronic apparatus such as a multimedia device are 5.1 channel audio signals or stereo channel audio signals. In the 5.1 channel audio signal, speech is present in a center channel, and in the stereo channel audio signal, speech is present in a signal in which a sound image angle is 0 degree.

Thus, the speech/non-speech separator 121, upon or based on receiving the 5.1 channel, may extract a speech from a center channel signal. Since the center channel includes a non-speech signal in addition to a speech signal, the speech/non-speech separator 121 can extract a non-speech signal of the center channel excluding the extracted speech signal and a signal of a remaining channel (a sub-woofer channel, a front left channel, a front right channel, a rear left channel, and a rear light channel) as a non-speech signal.

When (or based on) a stereo channel audio signal is received, the speech/non-speech separator 121 can extract a speech signal from a signal having a sound phase angle of 0. In this example, a non-speech signal can be included in a signal having a sound image angle of 0 and therefore, the speech/non-speech separator 121 can extract a non-speech signal of a signal having a sound image angle of 0, excluding the extracted speech signal, and a signal of the remaining sound image angle (i.e., a signal at a different angle other than a zero-degree angle) as a non-speech signal.

The speech/non-speech separator 121 may extract a speech signal using various existing speech signal extraction algorithms. According to an embodiment, the speech/non-speech separator 121 can extract a speech signal using an artificial intelligence-based algorithm trained to extract a speech signal. Here, the artificial intelligence model can include at least one of a deep learning model, a convolutional neural network (CNN) model, and recurrent neural network (RNN) model.

The artificial intelligence model trained to extract the speech signal may be included in a storage of the electronic apparatus 100 to be utilized by the speech/non-speech separator 121, and/or may be included in a server external to the electronic apparatus 100 and utilized by the speech/non-speech separator 121 through the communication of the server and the electronic apparatus 100.

The speech/non-speech separator 121 may extract a speech signal from the audio signal using a simple noise canceling method or various speech extraction methods based on audio feature.

The audio feature may include at least one of time domain feature such as short term energy (STE), zero crossing rate (ZCR), low short term energy ratio (LSTER), high zero crossing rate ratio (HZCRR), and frequency domain feature such as a Mel-frequency cepstral coefficient (MFCC), total power spectrum, sub-band powers, frequency centroid, bandwidth, pitch frequency, spectrum flux (SF), or the like.

According to various embodiments, the non-speech signal may denote the rest of the signal except for the extracted speech signal as described above in the entire audio signal. By way of example, the non-speech signal can be extracted through Equation 2 below.

non-speech signal=entire received audio signal−speech signal [Equation 2]

The extracted speech signal and the non-speech signal are used to identify intelligibility of speech included in the audio signal by the speech intelligibility analyzer 122.

For example, the speech intelligibility analyzer 122 may identify the speech intelligibility included in the received audio signal based on at least one of the SNR, the SII, the STI, or the like.

Specifically, according to an embodiment, the speech intelligibility analyzer 122 can identify the SNR measured by the following Equation 3 as the intelligibility of the speech included in the received audio signal.

$$SNR = 10 \times \log_{10}\left(\frac{\text{speech signal}}{\text{remaining signals}}\right) \quad [\text{Equation 3}]$$

According to another embodiment, the speech intelligibility analyzer 122 may identify the sound intelligibility index (SII), which may be measured using the US standard method, as the intelligibility of the speech included in the received audio signal. Here, the sound intelligibility index is also measured on the basis of the speech signal and the non-speech signal (the remaining signal) separated from the audio signal.

Figure 4:
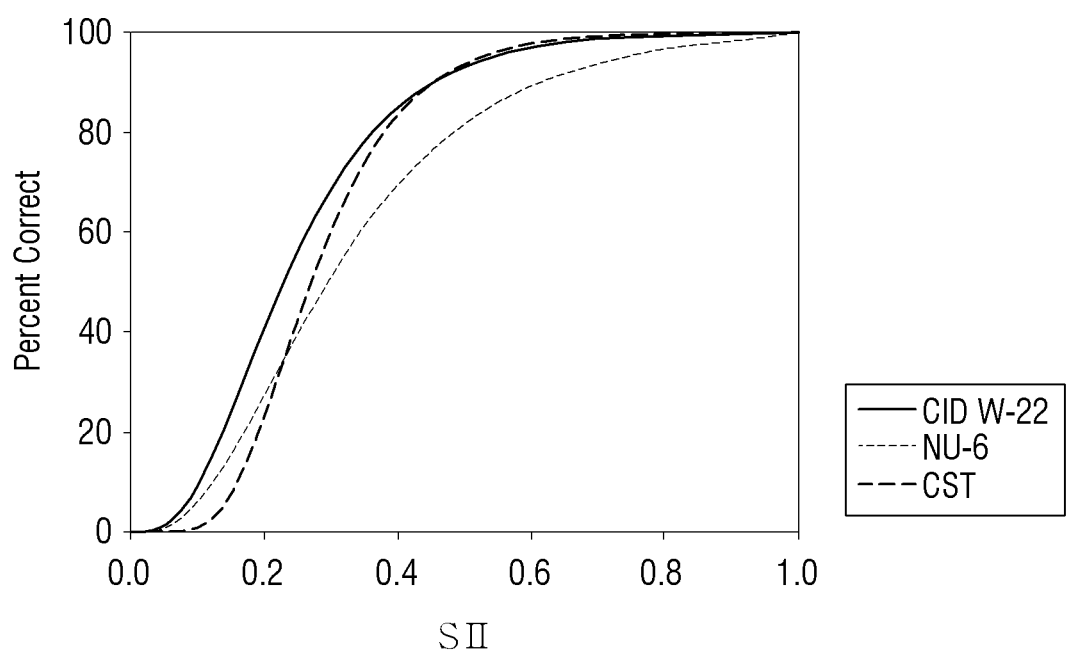
FIG. 4 is a graph illustrating speech recognition accuracy according to a speech intelligibility index.

FIG. 4 is a graph illustrating speech recognition accuracy in accordance with the speech intelligibility index. Specifically, FIG. 4 illustrates the user's speech recognition accuracy for three audio data sets, such as CID W-22, NU-6, and CST, where a horizontal axis of the graph indicates the SII, and a vertical axis indicates speech recognition accuracy.

Referring to FIG. 4, when the SII is greater than or equal to 0.6, 90% or higher speech recognition accuracy for all three data sets is indicated. This numeral value (0.6) may be used as the level of target intelligibility by a speech intelligibility renderer 124.

According to another embodiment, the speech intelligibility analyzer 122 may identify an objective number reflecting the degree of speech recognition such as STI as the intelligibility of the speech included in the received audio signal.

The scene analyzer 123 may analyze the audio signal to obtain scene information. Specifically, the scene analyzer 123 may obtain at least one audio feature for a predetermined number of audio frames of the plurality of audio frames included in the audio signal, and obtain scene information for the predetermined number of audio frames based on the obtained audio features.

The audio feature may include at least one time domain feature such as short term energy (STE), zero crossing rate (ZCR), low short term energy ratio (LSTER), high zero crossing rate ratio (HZCRR), and/or at least one frequency domain feature such as a Mel-frequency cepstral coefficient (MFCC), total power spectrum, sub-band powers, frequency centroid, bandwidth, pitch frequency, spectrum flux (SF), or the like.

For example, if the audio signal is a stereo audio signal and the scene information is obtained for each pair of L, R audio frames, the scene analyzer 123 may analyze the pair of L, R audio frames to extract at least one of the audio features, and based on the extracted audio features, may identify whether the L, R audio frames include a type of audio (and which type) among the sound effect, shout, and music.

According to another embodiment, the scene analyzer 123 may obtain scene information using an artificial intelligence model trained to identify the type of audio included in the audio signal. The artificial intelligence model may include at least one of a deep learning model, a convolutional neural network (CNN) model, and a recurrent neural network (RNN) model.

For example, where the audio signal is a stereo audio signal and the scene information is obtained for each pair of L, R audio frames, the scene analyzer 123 can identify whether the L, R audio frame includes a type of audio among the sound effect, shout, and music and which type of audio is included, whether the L, R audio frame contains sound, implicit, and music, via a pair of calculating a probability of matching for each audio type using the trained CNN model and a spectrogram pattern in which a pair of L, R audio frames are converted to two-dimensional axis.

The artificial intelligence model trained to identify the type of audio may also be included in the storage of the electronic apparatus 100, to be used by the scene analyzer 123, like the artificial intelligence model trained to extract a speech signal, and/or may be included in a server existing outside the electronic apparatus 100 and may be used by the scene analyzer 123 through communication between the server and the electronic apparatus 100.

While in the above example, the scene analyzer 123 directly analyzes or processes the audio signal to obtain scene information, it is understood that one or more other embodiments are not limited thereto. For example, the scene analyzer 123 may receive scene information corresponding to the received audio signal from an external server that generates and manages scene information about the audio content.

The speech intelligibility renderer 124 may control the speech intelligibility included in the audio signal by correcting at least one of the speech signal and remaining signals, by utilizing the speech intelligibility identified by the speech intelligibility analyzer 122 and the scene information obtained by the scene analyzer 123.

Specifically, the speech intelligibility renderer 124 may control the gain of the speech signal to control the speech intelligibility. At this time, the degree of intelligibility controlling can be identified through the intelligibility information of the speech received from the speech intelligibility analyzer 122 and the scene information received from the scene analyzer 123.

For example, where the intelligibility of speech is identified to be the speech intelligibility index, if it is a target that the user recognizes speech at a level of 90%, as described above with reference to FIG. 4, the speech intelligibility index should be about 0.6. If the currently identified speech intelligibility index is 0.4, 0.2 should be raised to obtain the speech intelligibility of a desired level.

How much gain value should be adjusted to raise the intelligibility index by 0.2 can be predicted or determined through conducting an experiment of a numeral change in the speech intelligibility index according to a change in gain of the speech signal. For example, whenever the gain of the speech signal is increased by 1 dB for various audio signals, a change in numeral value of the speech intelligibility index may be observed and calculated back to obtain α and β of Equation 1 described above, and the gain adjustment value of the speech signal to raise the speech intelligibility index by 0.2 can be calculated through Equation 1.

According to various embodiments, what % of recognizing speech by a user would be a target (that is, target intelligibility) is identified by scene information.

Further, according to various embodiments, by setting target intelligibility by audio types included in the audio signal differently, speech intelligibility can be adjusted by reflecting a manufacturing intention of an audio content manufacturer.

When the type of audio is the sound effect, there is a statistic that the sound effect is important, though a viewer considers speech to be most important. Therefore, it is necessary to sufficiently compensate the speech intelligibility that may degrade due to the sound effect.

For example, if the target intelligibility is the speech intelligibility index of 0.6, and the measured speech intelligibility is the SII index of 0.5, the speech intelligibility renderer 124 may adjust the gain of the speech signal by a gain adjustment value calculated via Equation 1 to raise the user's speech recognition accuracy up to 90%.

The shouting sound during sports has a large impact on a sense of realness that a viewer may feel. Thus, when the audio type is shout, if the target intelligibility is set too high, the shout signal compared to speech grows relatively small and thus, the sense of realness may fall as compared to before adjustment of the speech intelligibility. Accordingly, the target intelligibility may be set to an appropriate number through experimentation. At this time, the appropriate value through the experimentation can be a value smaller than the target intelligibility when the type of audio is sound effect, although it is understood that one or more other embodiments are not limited thereto.

For example, if the target intelligibility is set to the speech intelligibility index of 0.6, the speech of a commentator and an announcer can be clear, but remaining signals in which the shouting exists can be relatively small and thus, a viewer may not enjoy the sense of realness sufficiently. The target intelligibility can therefore be set to around the speech intelligibility index of 0.5 to maintain both the appropriate intelligibility and the sense of realness.

In music, it is important to maintain the balance between vocal and instrumental sounds intended by a producer. Therefore, if the audio type is music, the gain of the speech signal can be adjusted to a maximum of 3 dB even though the intelligibility value of the speech measured by the speech intelligibility analyzer 122 is low, or by not adjusting the gain of the speech signal, the intention of the music content producer can be reflected as much as possible.

In the above example, the speech intelligibility renderer 124 controls the gain of the speech signal to control the speech intelligibility, although it is understood that one or more other embodiments are not limited thereto. For example, the speech intelligibility renderer 124 may control the gain of the non-speech signal, or may control the intelligibility of the speech by utilizing a technique such as a dynamic range compressor, a linear prediction coefficient (LPC) filter, a harmonic enhancer, or the like.

As described above, the speech intelligibility renderer 124 may adjust the speech intelligibility included in the received audio signal and may generate the audio signal having the adjusted speech intelligibility as an output signal. The generated output signal may be output through at least one speaker.

Meanwhile, the processor 120 may include a central processing unit (CPU), a micro controller unit (MCU), micom (micro-processor), electronic control unit (ECU), an application processor (AP) and/or other electronic units (hereinafter, "CPU, etc.") capable of processing various calculations and generating a control signal, to control an operation of the speech/non-speech separator 121, speech intelligibility analyzer 122, the scene analyzer 123, the speech intelligibility renderer 124. In this case, the CPU, or the like, may be provided in a form integrated with at least one or a part of the speech/non-speech separator 121, the speech intelligibility analyzer 122, the scene analyzer 123, or the speech intelligibility renderer 124.

The speech/non-speech separator 121, the speech intelligibility analyzer 122, the scene analyzer 123, and the speech intelligibility renderer 124 can be integrated into one or more functional modules and form the processor 120. For example, the speech intelligibility analyzer 122, the scene analyzer 123, and the speech intelligibility renderer 124 may be integrated into a single signal processing module, or the speech/non-speech separator 121, the speech intelligibility analyzer 122, the scene analyzer 123, and the speech intelligibility renderer 124 may be integrated into a single signal processing module. The signal processing module may be, but is not limited to, a digital signal processor (DSP).

Figure 5:
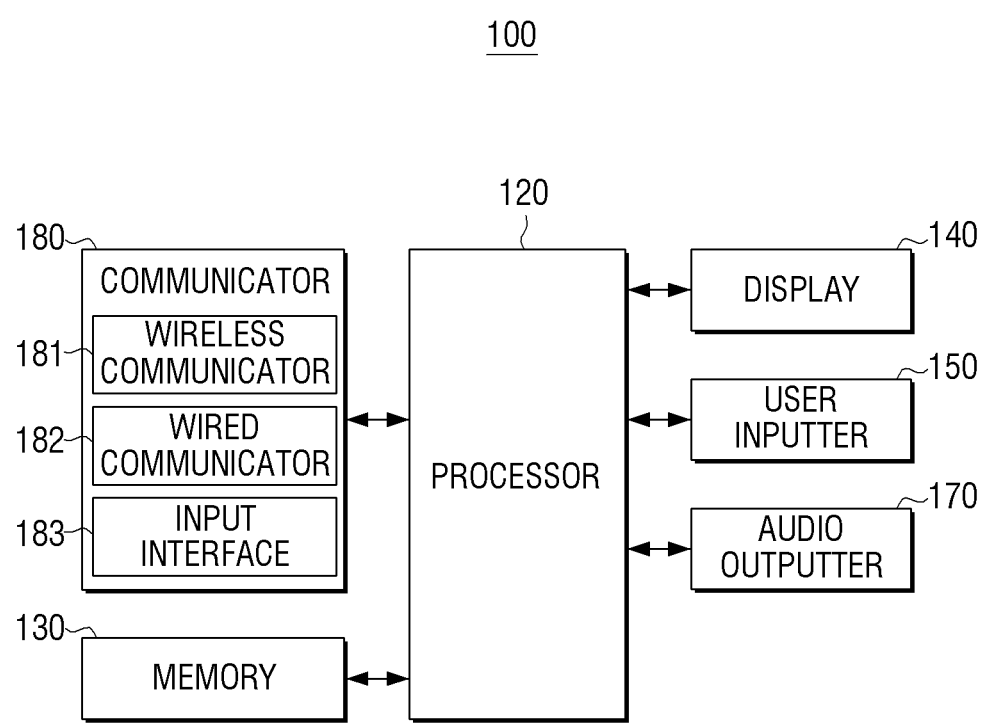
FIG. 5 is a detailed block diagram of an electronic apparatus according to an embodiment.

FIG. 5 is a detailed block diagram of an electronic device 100 according to an embodiment. Referring to FIG. 5, the electronic apparatus 100 may include a processor 120, a memory 130, a display 140, a user inputter 150, a communicator 180, and an audio outputter 170. Depending on the implementation example, some components of the electronic apparatus 100 shown in FIG. 5 may be omitted and/or other components may be included.

The audio outputter 170 is configured to output an audio signal as an output signal. The audio outputter 170 may output an audio signal adjusted by the processor 120 as described above. The audio outputter 170 may include at least one speaker and/or a terminal or interface for outputting an audio signal to an external speaker or audio output device.

The communicator 180 is configured to communicate with an external device. The communicator 180 may include a wireless communicator 181, a wired communicator 182, and an input interface 183.

The wireless communicator 181 may communicate with the external broadcast transmitting station 1, a satellite 2, a content providing server 3, and other terminal devices using a wireless communication technology and/or a mobile communication technology. The wireless communication technologies include, for example, Bluetooth, Bluetooth low energy, CAN communication, Wi-Fi, Wi-Fi Direct, ultra-wide band (UWB), Zigbee, infrared data association (IrDA), near field communication (NFC), or the like, and the mobile communication technology may include 3GPP, Wi-Max, long term evolution (LTE), 5th generation (5G), or the like.

The wireless communicator 181 may receive audio content from another terminal device or a server, and may transmit the received audio content to the processor 120. The wireless communicator 181 may be implemented using an antenna, a communication chip, a substrate, etc., which can transmit electromagnetic waves to the outside or receive electromagnetic waves transmitted from the outside.

The wired communicator 182 can communicate with the external broadcast transmission station 1, the satellite 2, the content providing server 3, and other terminal devices on the basis of a wired communication network. Here, the wired communication network may be implemented using a physical cable such as, for example, a pair cable, a coaxial cable, an optical fiber cable, or an Ethernet cable. The wired communicator 182 may receive audio content from another terminal device or a server and transmit the received audio content to the processor 120.

Any one of the wireless communicator 181 and the wired communicator 182 may be omitted according to an embodiment. Accordingly, the audio output device 100 may include only the wireless communicator 181 or only the wired communicator 182. In addition, the audio output device 100 may include an integrated communicator that supports both a wireless connection by the wireless communicator 181 and a wired connection by the wired communicator 182.

The input interface 183 may be connected to another device, e.g., an external storage device, provided separately from the audio output device 100, and may receive audio content from another device and transmit or provide the received audio content to the processor 120. For example, the input interface 183 may be a universal serial bus (USB) terminal, and may include at least one of various interface terminals, such as a high definition multimedia interface (HDMI) terminal, a Thunderbolt terminal, or the like.

Meanwhile, in FIG. 5, the audio output unit 170 including at least one speaker is directly connected to the processor 120 of the electronic apparatus 100 (specifically, the speech intelligibility renderer 124 included in the processor 120) and embedded in the electronic apparatus 100, but it is understood that one or more other embodiments are not limited thereto.

As described above, the output signal generated by the processor 120 may be output through a separate speaker installed or provided outside the electronic apparatus 100. In this case, a separate speaker installed outside the electronic apparatus 100 can be connected to the electronic apparatus 100 through the communicator 180, and the output signal generated by the processor 120 can be output to the separate speaker installed outside the electronic apparatus 100 through the communicator 180.

According to an embodiment, the communicator 180 may communicate with an external server generating and managing scene information for audio content, an external server generating and managing an artificial intelligence model trained to extract a speech signal, and/or an external server generating and managing a trained artificial intelligence model to identify the type of audio included in the audio signal, and may receive scene information or various artificial intelligence models from an external server.

The memory 130 may temporarily or non-temporarily store the audio content and may forward the audio content to the processor 120 in the form of an audio signal in accordance with the call of the processor 120. The memory 130 may store various information necessary for operation, processing, or control operations of the processor 120 in an electronic format.

For example, the memory 130 may store all or a portion of various data, applications, filters, algorithms, or the like, necessary for operation of the processor 120, and may provide the same to the processor 120 as needed. Here, the application may be obtained through an electronic software distribution network accessible through the wireless communicator 181 or the wired communicator 182.

The memory 130 may include, for example, at least one of a main memory device and an auxiliary memory device. The main memory may be implemented using semiconductor storage media such as read only memory (ROM) and/or random access memory (RAM). The ROM may include, for example, a conventional ROM, EPROM, EEPROM, and/or mask-ROM. The RAM may include, for example, DRAM and/or SRAM. The auxiliary memory device may be implemented using at least one storage medium capable of permanently or semi-permanently storing data, such as a flash memory device, a secure digital memory (SD) card, a solid state drive (SSD), a solid state drive (SSD), a hard disk drive (HDD), a magnetic drum, a compact disc (CD), an optical media such as a digital video disc (DVD) or a laser disc, a magnetic tape, a magneto-optical disk, and/or a floppy disk.

In the electronic apparatus 100 of FIG. 2, the inputter 110 is configured to receive an audio signal and provide the same to the processor 120. Referring to FIG. 5, an audio signal may be provided to the processor 120 through the communicator 180 or the memory 130. Thus, in FIG. 5, the communicator 180 and the memory 130 may correspond to the inputter 110 as described in FIG. 2.

The display 140 displays various images. In particular, when a video signal is received through the communicator 180 or the memory 130, the processor 120 can reproduce the video through the display 140. The display 140 may include various types of display panels, such as, but not limited to, a liquid crystal display (LCD) panel, an organic light emitting diode (OLED) panel, a plasma display panel (PDP) panel, an inorganic LED panel, a micro LED panel, and the like. The display 140 may constitute a touch screen with a touch panel.

The user inputter 150 is configured to receive various user inputs. For this purpose, the user inputter 150 may include various buttons or touch panels, but is not limited thereto.

The processor 120 controls overall operations of the audio output device 100. The processor 120 may perform operations of the electronic apparatus 100, the processor 120, or the functional blocks of the processor 120 as described above with reference to FIGS. 1 to 4.

If the audio content is transmitted through the memory 130 or the communicator 180, the processor 120 may decode the audio content and convert the content into an uncompressed format. Here, decoding refers to a process of restoring an audio signal compressed by an audio compression format such as an MPEG layer-3 (MP3), advanced audio coding (AAC), audio codec-3 (AC-3), digital theater system (DTS), free lossless audio codec (FLAC), windows media audio (WMA), or the like, into an uncompressed audio signal. If the audio content is not compressed, this decoding process may be omitted. The restored audio signal may include one or more channels.

Figure 6:
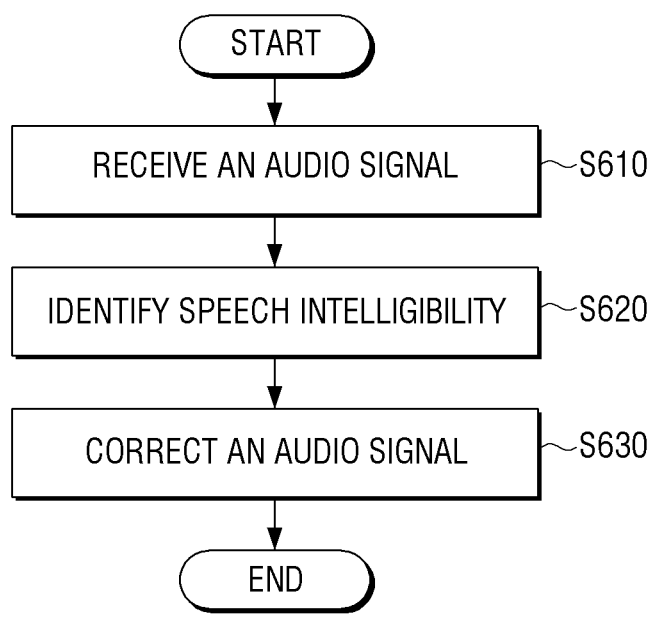
FIG. 6 is a flowchart illustrating a method for controlling an electronic apparatus according to an embodiment.

FIG. 6 is a flowchart illustrating a method of controlling an electronic apparatus 100 according to an embodiment. Referring to FIG. 6, the electronic apparatus 100 may receive an audio signal in operation S610 and identify the speech intelligibility included in the audio signal based on the received audio signal in operation S620.

For example, the electronic apparatus 100 may calculate the speech intelligibility based on a speech signal and a non-speech signal other than the speech signal, included in the received audio signal. The electronic apparatus 100 may extract a speech signal included in the audio signal using an artificial intelligence model trained to extract a speech signal included in the audio signal, and may extract a remaining signal except the extracted speech signal from the audio signal as a non-speech signal.

Accordingly, the electronic apparatus 100 can adjust the audio signal so that the identified speech intelligibility becomes the target intelligibility in operation S630. Here, the target intelligibility is a value set based on scene information related to the type of audio included in the audio signal, and the type of audio included in the scene information can include at least one of a sound effect, shout, and music.

The electronic apparatus 100 may obtain at least one audio feature for the audio signal and obtain scene information based on the obtained at least one audio feature. Alternatively, the electronic apparatus 100 may obtain scene information using an artificial intelligence model trained to identify the type of audio included in the audio signal.

According to an embodiment, the target intelligibility can be set differently for each type of audio. For example, the target intelligibility can be set relatively higher if the type of audio is a sound effect, but is not limited thereto.

The intelligibility described above may be any one of a signal-to-noise ratio (SNR) of the speech signal and the non-speech signal included in the audio signal, and a speech intelligibility index (SIT) based on the speech signal and the non-speech signal.

Accordingly, when (or based on) the intelligibility of the speech included in the audio signal is determined as the signal-to-noise ratio, the electronic apparatus 100 can adjust the gain of the speech signal by the difference between the target intelligibility and the identified speech intelligibility to correct the audio signal.

When (or based on) the speech intelligibility included in the audio signal is identified as the speech intelligibility index, the electronic apparatus 100 may calculate a gain adjustment value based on Equation 1 below, and adjust the gain of the speech signal by the calculated gain adjustment value to correct the audio signal.

$$\text{Gain adjustment value} = \alpha*(SII_{target} - SII_{measurement}) + \beta \quad [\text{Equation 1}]$$

The SII target is the target intelligibility, the SII measurement is the identified speech intelligibility, and α and β are constant values experimentally calculated through a change in the number of the speech intelligibility index according to a gain change of the speech signal.

According to various embodiments as described above, speech intelligibility can be more accurately controlled. In addition, optimal speech intelligibility can be adjusted by reflecting the producing intention of the audio content producer. Thus, the user can be provided with an optimal sound experience.

Various embodiments may be implemented in software including instructions stored in a machine-readable storage media readable by a machine (e.g., a computer). Here, the apparatus is a device calling stored instructions from a storage medium and operates according to the called instructions and can include an electronic apparatus 100, 100-1 to 100-4 according to embodiments.

When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium is not limited to a signal but is tangible, and does not distinguish the case in which data is semi-permanently stored in a storage medium from the case in which data is temporarily stored in a storage medium.

Methods according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., PLAY STORE™ and APP STORE™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium such as memory of a relay server.

According to embodiments, the respective elements (e.g., module or program) of the elements mentioned above may include a single entity or a plurality of entities. Furthermore, at least one element or operation from among the corresponding elements mentioned above may be omitted, or at least one other element or operation may be added. Alternatively or additionally, a plurality of components (e.g., module or program) may be combined to form a single entity. As such, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

Although the disclosure has been described by way of examples, it will be understood by those skilled in the art that various changes in form and details may be made therein without departing from the essential characteristics thereof. In addition, the above embodiments are not intended to limit the technical spirit of the disclosure, but to describe the technical aspect and the scope of the technical aspect of the disclosure is not limited by the embodiments herein. Accordingly, the scope of protection of the disclosure should be construed to include at least the following claims, and all technical ideas that fall within the scope of the disclosure are to be construed as falling within the scope of the disclosure.

What is claimed is:

1. An electronic apparatus comprising:
an inputter; and
a processor configured to:
based on an audio signal being received through the inputter, obtain a speech intelligibility for the audio signal,
obtain at least one audio feature for the audio signal,
based on the audio feature being obtained, obtain scene information for the audio signal, wherein the scene information includes at least one audio feature for a predetermined number of audio frames included in the audio signal,
based on the scene information being obtained, identify a type of an audio included in the audio signal, and
identify a difference between the speech intelligibility and a target intelligibility, and modify the audio signal based on the identified difference so that the speech intelligibility becomes the target intelligibility, the target intelligibility being set differently for each type of the audio based on a percentage adjustment for each type of the audio, wherein the type of the audio includes at least one of a sound effect, shouting, music, or a speech, and the percentage adjustment for the sound effect is higher than the percentage adjustment for the music, and the percentage adjustment for the shouting is less than the percentage adjustment for the music,
wherein the processor is further configured to:
identify a degree of adjust of the speech intelligibility based on the scene information, and
modify a gain value of the audio signal based on the identified degree of adjust of the speech intelligibility.

2. The electronic apparatus of claim 1, wherein the processor is further configured to obtain the scene information using an artificial intelligence model trained to distinguish audio types included in audio signals.

3. The electronic apparatus of claim 1, wherein the target intelligibility is set differently with respect to different audio types.

4. The electronic apparatus of claim 1, wherein, based on the type of the audio being the sound effect, the target intelligibility is set to be higher than a case in which the type of the audio is the shouting.

5. The electronic apparatus of claim 1, wherein the processor is further configured to calculate the speech intelligibility based on a speech signal and a non-speech signal, included in the audio signal.

6. The electronic apparatus of claim 5, wherein the processor is further configured to extract the speech signal included in the audio signal using an artificial intelligence model trained to extract speech signals included in audio signals, and to extract, from the audio signal, one or more remaining signals other than the extracted speech signal, as the non-speech signal.

7. The electronic apparatus of claim 5, wherein the speech intelligibility is one of a signal to noise ratio (SNR) of the speech signal and the non-speech signal included in the audio signal and a speech intelligibility index (SII) based on the speech signal and the non-speech signal.

8. The electronic apparatus of claim 7, wherein:
the speech intelligibility is the SNR; and
the processor is further configured to adjust a gain of the speech signal by as much as a difference value between the target intelligibility and the obtained speech intelligibility to modify the audio signal.

9. The electronic apparatus of claim, 7, wherein:
the speech intelligibility is the SII;
the processor is further configured to calculate a gain adjustment value and adjust a gain of the speech signal by as much as the calculated gain adjustment value to modify the audio signal;
the gain adjustment value is calculated according to: gain adjustment value=$\alpha*(SII_{target}-SII_{measurement})+\beta$; and
$SII_{target}$ denotes the target intelligibility, $SII_{measurement}$ denotes the obtained speech intelligibility, and $\alpha$ and $\beta$ denote constant values experimentally calculated through a change in a number of the SII over a change in the gain of the speech signal.

10. A method of controlling an electronic apparatus, the method comprising:
obtaining an audio signal;
obtaining a speech intelligibility for the audio signal based on the audio signal;
obtaining at least one audio feature for the audio signal;
based on the audio feature being obtained, obtaining scene information for the audio signal, wherein the scene information includes at least one audio feature for a predetermined number of audio frames included in the audio signal;
based on the scene information being obtained, identifying a type of an audio included in the audio signal; and
identifying a difference between the speech intelligibility and a target intelligibility, and modifying the audio signal based on the identified difference so that the speech intelligibility becomes the target intelligibility, the target intelligibility being set differently for each type of the audio based on a percentage adjustment for each type of the audio, wherein the type of the audio includes at least one of a sound effect, shouting, music, or a speech, and the percentage adjustment for the sound effect is higher than the percentage adjustment for the music, and the percentage adjustment for the shouting is less than the percentage adjustment for the music, and wherein the modifying the audio signal comprises:

identifying degree of adjust of the speech intelligibility based on the scene information, and modifying a gain value of the audio signal based on the identified degree of adjust of the speech intelligibility.

11. The method of claim 10, further comprising:

obtaining the scene information using an artificial intelligence model trained to distinguish audio types included in audio signals.

12. The method of claim 10, wherein the target intelligibility is set differently with respect to different audio types.

13. The method of claim 10, wherein the obtaining the speech intelligibility comprises calculating the speech intelligibility based on a speech signal and a non-speech signal, included in the audio signal.

14. The method of claim 13, wherein the obtaining the speech intelligibility comprises:

extracting the speech signal included in the audio signal using an artificial intelligence model trained to extract speech signals included in audio signals; and extracting, from the audio signal, one or more remaining signals other than the extracted speech signal, as the non-speech signal.

15. The method of claim 13, wherein the speech intelligibility is one of a signal to noise ratio (SNR) of the speech signal and the non-speech signal included in the audio signal and a speech intelligibility index (SII) based on the speech signal and the non-speech signal.

16. The method of claim 15, wherein:

the speech intelligibility is the SNR; and the modifying comprises adjusting a gain of the speech signal by as much as a difference value between the target intelligibility and the obtained speech intelligibility to modify the audio signal.

17. The method of claim 15, wherein:

the speech intelligibility is the SII;

the modifying comprises calculating a gain adjustment value and adjusting a gain of the speech signal by as much as the calculated gain adjustment value to modify the audio signal;

the gain adjustment value is calculated according to: gain adjustment value=$\alpha*(SII_{target}-SII_{measurement})+\beta$; and $SII_{target}$ denotes the target intelligibility, $SII_{measurement}$ denotes the obtained speech intelligibility, and $\alpha$ and $\beta$ denote constant values experimentally calculated through a change in a number of the SII over a change in the gain of the speech signal.

18. An electronic apparatus comprising:

a memory storing instructions; and a processor configured to execute the instructions to:

obtain a speech intelligibility for an audio signal, obtain at least one audio feature for the audio signal, based on the audio feature being obtained, obtain scene information for the audio signal, wherein the scene information includes at least one audio feature for a predetermined number of audio frames included in the audio signal, based on the scene information being obtained, identify a type of an audio included in the audio signal, and identify a difference between the speech intelligibility and α target intelligibility, and modify the audio signal based on the identified difference so that the speech intelligibility becomes the target intelligibility, the target intelligibility being set differently for each type of the audio based on a percentage adjustment for each type of the audio, wherein the type of the audio includes at least one of a sound effect, shouting, music, or a speech, and the percentage adjustment for the sound effect is higher than the percentage adjustment for the music, and the percentage adjustment for the shouting is less than the percentage adjustment for the music, and wherein the processor is further configured to:

identify a degree of adjust of the speech intelligibility based on the scene information.

\* \* \* \* \*